US012802280B2

(12) United States Patent

Xie et al.

(10) Patent No.: US 12,802,280 B2

(45) Date of Patent: Nov. 17, 2026

(54) DYNAMIC IMAGE COMPRESSION METHOD

(71) Applicant: Beken Corporation, Shanghai (CN)

(72) Inventors: Anan Xie, Shanghai (CN); Xiang Liu, Shanghai (CN); Guodong Wang, Shanghai (CN); Long Chen, Shanghai (CN)

(73) Assignee: Beken Corporation, Shanghai (CN)

( * ) Notice: Subject to any disclaimer, the term of this patent is extended or adjusted under 35 U.S.C. 154(b) by 210 days.

(21) Appl. No.: 18/984,626

(22) Filed: Dec. 17, 2024

(65) Prior Publication Data

US 2026/0170694 A1 Jun. 18, 2026

(30) Foreign Application Priority Data

Sep. 27, 2024 (CN) ........................ 202411374169.3

(51) Int. Cl.

*G06T 9/00* (2006.01)
*G06T 3/40* (2024.01)
*G06T 7/10* (2017.01)

(52) U.S. Cl.

CPC .................. *G06T 9/00* (2013.01); *G06T 3/40* (2013.01); *G06T 7/10* (2017.01); *G06T 2207/20021* (2013.01)

(58) Field of Classification Search

CPC .... G06T 9/00; G06T 3/40; G06T 7/10; G06T 2207/20021; H04N 19/124; H04N 19/176; H04N 19/172; H04N 19/126; H04N 19/14; H04N 19/119; H04N 19/159; H04N 19/167; H04N 19/61; H04N 19/105; H04N 19/136; H04N 19/149; H04N 19/154; H04N 19/174; H04N 19/184; H04N 19/152; H04N 19/17; H04N 19/18; H04N 19/46; H04N 19/115; H04N 19/137; H04N 19/147; H04N 19/625; H04N 19/122; H04N 19/139; H04N 19/142

See application file for complete search history.

(56) References Cited

U.S. PATENT DOCUMENTS

| | | | | |
|---|---|---|---|---|
| 8,175,147 B1 * | 5/2012 | Webb .................. | H04N 19/159 375/240.06 |
| 10,075,727 B2 * | 9/2018 | Edpalm ................ | H04N 19/513 |
| 11,234,014 B2 * | 1/2022 | Ardo .................... | H04N 19/177 |

(Continued)

*Primary Examiner* — Michael S Osinski

(74) *Attorney, Agent, or Firm* — Schwegman Lundberg & Woessner, P.A.

(57) ABSTRACT

The present disclosure provides a system and a method for image compression. The method includes obtaining an image frame and dividing it into a set of image blocks. A preliminary quantization profile is then obtained. Each image block undergoes a Discrete Cosine Transform (DCT) to create a frequency-dependent image profile, which is subsequently quantized using the preliminary quantization profile and compressed using at least one compression encoding algorithm. The size of the compressed image frame is compared with a target size range, and the preliminary quantization profile is updated based on the comparison result. Additionally, the method includes dynamically adjusting the target size range based on environmental or network conditions of the system, thereby enhancing real-time adaptability and efficiency in handling dynamic environment and complex scenes.

20 Claims, 17 Drawing Sheets

(56) References Cited

U.S. PATENT DOCUMENTS

| | | | | |
|---|---|---|---|---|
| 11,863,755 | B2 * | 1/2024 | Possos | H04N 19/124 |
| 12,579,699 | B2 * | 3/2026 | Wu | G06T 9/40 |
| 2003/0215011 | A1 * | 11/2003 | Wang | H04N 19/40 375/E7.14 |
| 2006/0256857 | A1 * | 11/2006 | Chin | H04N 19/61 375/E7.157 |
| 2010/0316120 | A1 * | 12/2010 | Abe | H04N 19/126 375/240.03 |
| 2011/0150287 | A1 * | 6/2011 | Flosdorf | G06T 7/246 382/107 |
| 2011/0188769 | A1 * | 8/2011 | Fuchie | H04N 19/15 382/252 |
| 2012/0033731 | A1 * | 2/2012 | Yamamoto | H04N 19/61 375/240.12 |
| 2014/0286406 | A1 * | 9/2014 | Kim | H04N 19/176 375/240.03 |
| 2016/0037170 | A1 * | 2/2016 | Zhang | H04N 19/147 375/240.12 |
| 2017/0150148 | A1 * | 5/2017 | Zhang | H04N 19/18 |
| 2017/0155902 | A1 * | 6/2017 | Suzuki | H04N 19/63 |
| 2017/0155903 | A1 * | 6/2017 | Rosewarne | H04N 19/13 |
| 2018/0027244 | A1 * | 1/2018 | Chen | H04N 19/174 375/240.03 |
| 2018/0084253 | A1 * | 3/2018 | Thiagarajan | H04N 19/625 |
| 2018/0084280 | A1 * | 3/2018 | Thiagarajan | H04N 19/61 |
| 2018/0255301 | A1 * | 9/2018 | Zhao | H04N 19/91 |
| 2018/0315171 | A1 * | 11/2018 | Lee | G06T 5/20 |
| 2019/0373284 | A1 * | 12/2019 | Mao | H04N 19/59 |
| 2020/0068200 | A1 * | 2/2020 | Galpin | H04N 19/196 |
| 2020/0260083 | A1 * | 8/2020 | Helmrich | H04N 19/176 |
| 2020/0260085 | A1 * | 8/2020 | Mao | H04N 19/132 |
| 2021/0192217 | A1 * | 6/2021 | Wang | G06F 18/22 |
| 2021/0211668 | A1 * | 7/2021 | Kim | H04N 19/184 |
| 2022/0078412 | A1 * | 3/2022 | Pihl | H04N 19/14 |
| 2022/0303538 | A1 * | 9/2022 | Zeng | H04N 19/146 |
| 2023/0247205 | A1 * | 8/2023 | Gillis | H04N 19/105 375/240.03 |
| 2024/0015288 | A1 * | 1/2024 | Bao | H04N 19/15 |
| 2024/0048719 | A1 * | 2/2024 | Helmrich | H04N 19/176 |
| 2024/0073431 | A1 * | 2/2024 | Rosewarne | H04N 19/174 |
| 2024/0179325 | A1 * | 5/2024 | Bhattacharyya | H04N 19/124 |
| 2024/0195968 | A1 * | 6/2024 | Xu | H04N 19/119 |
| 2024/0267559 | A1 * | 8/2024 | Hamada | H04N 19/132 |
| 2025/0024071 | A1 * | 1/2025 | Ahn | H04N 19/593 |
| 2025/0200726 | A1 * | 6/2025 | Xiong | G06T 5/70 |
| 2025/0240435 | A1 * | 7/2025 | Li | H04N 19/119 |
| 2025/0324071 | A1 * | 10/2025 | Weber | H04N 19/124 |
| 2025/0392719 | A1 * | 12/2025 | Suzuki | H04N 19/124 |
| 2026/0038159 | A1 * | 2/2026 | Tian | G06N 3/0455 |
| 2026/0220860 | A1 * | 7/2026 | Li | G06T 13/00 |
| 2026/0222574 | A1 * | 7/2026 | Sun | H04N 19/124 |
| 2026/0230630 | A1 * | 8/2026 | Zhang | H04N 19/156 |

* cited by examiner

302

304

| | | | | | | | |
|---|---|---|---|---|---|---|---|
| 42<br>42<br>42 | 45<br>45<br>45 | 52<br>52<br>52 | 58<br>58<br>58 | 63<br>63<br>63 | 52<br>52<br>52 | 56<br>56<br>56 | 66<br>66<br>66 |
| 55<br>55<br>55 | 50<br>50<br>50 | 45<br>45<br>45 | 86<br>86<br>86 | 108<br>108<br>108 | 80<br>80<br>80 | 62<br>62<br>62 | 65<br>65<br>65 |
| 54<br>54<br>54 | 50<br>50<br>50 | 61<br>61<br>61 | 113<br>113<br>113 | 149<br>149<br>149 | 102<br>102<br>102 | 58<br>58<br>58 | 66<br>66<br>66 |
| 55<br>55<br>55 | 49<br>49<br>49 | 64<br>64<br>64 | 123<br>123<br>123 | 161<br>161<br>161 | 105<br>105<br>105 | 63<br>63<br>63 | 62<br>62<br>62 |
| 59<br>59<br>59 | 52<br>52<br>52 | 61<br>61<br>61 | 102<br>102<br>102 | 128<br>128<br>128 | 84<br>84<br>84 | 61<br>61<br>61 | 63<br>63<br>63 |
| 73<br>73<br>73 | 57<br>57<br>57 | 51<br>51<br>51 | 63<br>63<br>63 | 71<br>71<br>71 | 61<br>61<br>61 | 49<br>49<br>49 | 69<br>69<br>69 |
| 80<br>80<br>80 | 64<br>64<br>64 | 56<br>56<br>56 | 50<br>50<br>50 | 45<br>45<br>45 | 52<br>52<br>52 | 57<br>57<br>57 | 78<br>78<br>78 |
| 83<br>83<br>83 | 73<br>73<br>73 | 62<br>62<br>62 | 83<br>83<br>83 | 57<br>57<br>57 | 70<br>70<br>70 | 72<br>72<br>72 | 91<br>91<br>91 |

FIG. 3B

402

| | | | | | | | |
|---|---|---|---|---|---|---|---|
| 52 | 55 | 61 | 66 | 70 | 61 | 64 | 73 |
| 63 | 59 | 55 | 90 | 109 | 85 | 69 | 72 |
| 62 | 59 | 68 | 113 | 144 | 104 | 66 | 73 |
| 63 | 58 | 71 | 122 | 154 | 106 | 70 | 69 |
| 67 | 61 | 68 | 104 | 126 | 88 | 68 | 70 |
| 79 | 65 | 60 | 70 | 77 | 68 | 58 | 75 |
| 85 | 71 | 64 | 59 | 55 | 61 | 65 | 83 |
| 87 | 79 | 69 | 87 | 65 | 76 | 78 | 94 |

FIG. 4A

502

| | | | | | | | |
|---|---|---|---|---|---|---|---|
| -76 | -73 | -67 | -62 | -58 | -67 | -64 | -55 |
| -65 | -69 | -73 | -38 | -19 | -43 | -59 | -56 |
| -66 | -69 | -60 | -15 | 16 | -24 | -62 | -55 |
| -65 | -70 | -57 | -6 | 26 | -22 | -58 | -59 |
| -61 | -67 | -60 | -24 | -2 | -40 | -60 | -58 |
| -49 | -63 | -68 | -58 | -51 | -60 | -70 | -53 |
| -43 | -57 | -64 | -69 | -73 | -67 | -63 | -45 |
| -41 | -49 | -59 | -41 | -63 | -52 | -50 | -34 |

FIG. 5

602

| | | | | | | | |
|---|---|---|---|---|---|---|---|
| -415.38 | -30.19 | -61.20 | 27.24 | 56.12 | -20.10 | -2.39 | 0.46 |
| 4.47 | -21.86 | -60.76 | 10.25 | 13.15 | -7.09 | -8.54 | 4.88 |
| -46.83 | 7.37 | 77.13 | -24.56 | -28.91 | 9.93 | 5.42 | -5.65 |
| -48.53 | 12.07 | 34.1 | -14.76 | -10.24 | 6.3 | 1.83 | 1.95 |
| 12.12 | -6.55 | -13.20 | -3.95 | -1.87 | 1.75 | -2.79 | 3.14 |
| -7.73 | 2.91 | 2.38 | -5.94 | -2.38 | 0.94 | 4.3 | 1.85 |
| -1.03 | 0.18 | 0.42 | -2.42 | -0.88 | -3.02 | 4.12 | -0.66 |
| -0.17 | 0.14 | -1.07 | -1.07 | -1.17 | -0.10 | 0.5 | 1.68 |

FIG. 6

702

| | | | | | | | |
|---|---|---|---|---|---|---|---|
| 17 | 18 | 24 | 47 | 99 | 99 | 99 | 99 |
| 18 | 21 | 26 | 66 | 99 | 99 | 99 | 99 |
| 24 | 26 | 56 | 99 | 99 | 99 | 99 | 99 |
| 47 | 66 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |
| 99 | 99 | 99 | 99 | 99 | 99 | 99 | 99 |

FIG. 7

802

| | | | | | | | |
|---|---|---|---|---|---|---|---|
| -24 | -2 | -3 | 1 | 1 | 0 | 0 | 0 |
| 0 | -1 | -2 | 0 | 0 | 0 | 0 | 0 |
| -2 | 0 | 1 | 0 | 0 | 0 | 0 | 0 |
| -1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 8

1002

| | | | | | | | |
|---|---|---|---|---|---|---|---|
| 9 | 9 | 12 | 24 | 50 | 50 | 50 | 50 |
| 9 | 11 | 13 | 33 | 50 | 50 | 50 | 50 |
| 12 | 13 | 28 | 50 | 50 | 50 | 50 | 50 |
| 24 | 33 | 50 | 50 | 50 | 50 | 50 | 50 |
| 50 | 50 | 50 | 50 | 50 | 50 | 50 | 50 |
| 50 | 50 | 50 | 50 | 50 | 50 | 50 | 50 |
| 50 | 50 | 50 | 50 | 50 | 50 | 50 | 50 |
| 50 | 50 | 50 | 50 | 50 | 50 | 50 | 50 |

FIG. 10

1102

| | | | | | | | |
|---|---|---|---|---|---|---|---|
| -46 | -3 | -5 | 1 | 1 | 0 | 0 | 0 |
| 0 | -2 | -5 | 0 | 0 | 0 | 0 | 0 |
| -4 | 1 | 3 | 0 | -1 | 0 | 0 | 0 |
| -2 | 0 | 1 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 11

1202

| | | | | | | | |
|---|---|---|---|---|---|---|---|
| 68 | 72 | 96 | 188 | 396 | 396 | 396 | 396 |
| 72 | 84 | 104 | 264 | 396 | 396 | 396 | 396 |
| 96 | 104 | 224 | 396 | 396 | 396 | 396 | 396 |
| 188 | 264 | 396 | 396 | 396 | 396 | 396 | 396 |
| 396 | 396 | 396 | 396 | 396 | 396 | 396 | 396 |
| 396 | 396 | 396 | 396 | 396 | 396 | 396 | 396 |
| 396 | 396 | 396 | 396 | 396 | 396 | 396 | 396 |
| 396 | 396 | 396 | 396 | 396 | 396 | 396 | 396 |

FIG. 12

1302

| | | | | | | | |
|---|---|---|---|---|---|---|---|
| -6 | 0 | -1 | 0 | 0 | 0 | 0 | 0 |
| 0 | 0 | -1 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 13

DYNAMIC IMAGE COMPRESSION METHOD

CROSS REFERENCE TO RELATED APPLICATION

This application claims priority to and incorporates by reference Chinese patent application no. CN 202411374169.3 filed 27 Sep. 2024.

TECHNICAL FIELD

The present disclosure generally relates to image compression. In particular, example embodiments of the present disclosure address systems and methods for dynamically compressing an image to a desired size range with low processor and memory requirements.

BACKGROUND

The digital age has experienced exponential growth in the volume of data being generated, transmitted, and stored. Among the data types, images and videos constitute a significant portion. However, raw digital images require vast amounts of storage space and bandwidth, which often makes it impractical to store and/or transmit them in their original form. Image compression addresses this challenge by reducing the size of the images.

Conventional image compression methods, such as Joint Photographic Experts Group (JPEG)), typically employ uniform compression coefficients across different environments. This approach can lead to unstable output sizes or coding rates when environmental conditions change. For instance, a conventional compression method that produces an output image at a desired size for a night image might generate significantly larger image outputs day images due to the inclusion of more visual information.

Furthermore, these conventional image compression methods often rely on complex algorithms to achieve a precise size reduction. While this might enhance the quality of compressed images, it also results in high demands on bandwidth, processing power, and memory. Such requirements are particularly challenging for embedded systems, which are constrained by limited hardware resources and are often employed in real-time image processing and transmission scenarios.

SUMMARY

In one aspect, a method at a system for image compression is provided. The method may include obtaining a first image frame and dividing the first image frame into a set of image blocks. Each of the set of image blocks may include a predetermined count of pixels. The method may further include obtaining a preliminary quantization profile and generating a first compressed image frame based on the set of image blocks of the first image frame and the preliminary quantization profile. The preliminary quantization profile may include a preliminary quantization factor corresponding to each of the predetermined count of pixels. The method may further include obtaining a target size range of the first image frame, comparing a size of the first compressed image frame with the target size range of the first image frame, and updating the preliminary quantization profile based on the comparison between the size of compressed image frame with the target size range of the first image frame. The method may further include obtaining a second image frame and generating a second compressed image frame based on the second image frame and the updated preliminary quantization profile.

In another aspect, a system is provided. The system may include a processor and a memory storing instructions. When executed by the processor, the instructions may configure the system to obtain a first image frame and divide the first image frame into a set of image blocks. Each of the set of image blocks may include a predetermined count of pixels. The instructions may further configure the system to obtain a preliminary quantization profile and generate a first compressed image frame based on the set of image blocks of the first image frame and the preliminary quantization profile. The preliminary quantization profile may include a preliminary quantization factor corresponding to each of the predetermined count of pixels. The instructions may further configure the system to obtain a target size range of the first image frame, compare a size of the first compressed image frame with the target size range of the first image frame, and update the preliminary quantization profile based on the comparison between the size of compressed image frame with the target size range of the first image frame. The instructions may further configure the system to obtain a second image frame and generate a second compressed image frame based on the second image frame and the updated preliminary quantization profile.

In another aspect, a non-transitory computer-readable storage medium is provided. The computer-readable storage medium may include instructions that when executed by a system, cause the system to obtain a first image frame and divide the first image frame into a set of image blocks. Each of the set of image blocks may include a predetermined count of pixels. The instructions may further cause the system to obtain a preliminary quantization profile and generate a first compressed image frame based on the set of image blocks of the first image frame and the preliminary quantization profile. The preliminary quantization profile may include a preliminary quantization factor corresponding to each of the predetermined count of pixels. The instructions may further cause the system to obtain a target size range of the first image frame, compare a size of the first compressed image frame with the target size range of the first image frame, and update the preliminary quantization profile based on the comparison between the size of compressed image frame with the target size range of the first image frame. The instructions may further cause the system to obtain a second image frame and generate a second compressed image frame based on the second image frame and the updated preliminary quantization profile.

BRIEF DESCRIPTION OF THE DRAWINGS

To easily identify the discussion of any particular element or act, the most significant digit or digits in a reference number refer to the figure number in which that element or act is first introduced.

FIG. 3B illustrates RGB values of pixels in the example image block, in accordance with some example embodiments.

FIG. 4A illustrates luma component levels of pixels in the example image block, in accordance with some example embodiments.

FIG. 5 illustrates a centralized luma component levels of pixels in the example image block, in accordance with some example embodiments.

FIG. 6 illustrates a frequency-dependent profile of the centralized luma component levels of pixels in the example image block, in accordance with some example embodiments.

FIG. 7 illustrates an example quantization profile for luma component levels, in accordance with some example embodiments.

FIG. 8 illustrates a quantized image block, in accordance with some example embodiments.

FIG. 10 illustrates an updated quantization profile for luma component levels, in accordance with some example embodiments.

FIG. 11 illustrates a quantized image block generated based on the updated quantization profile, in accordance with some example embodiments.

FIG. 12 illustrates an updated quantization profile for luma component levels, in accordance with some example embodiments.

FIG. 13 illustrates a quantized image block generated based on the updated quantization profile, in accordance with some example embodiments.

DETAILED DESCRIPTION

Figure 1:
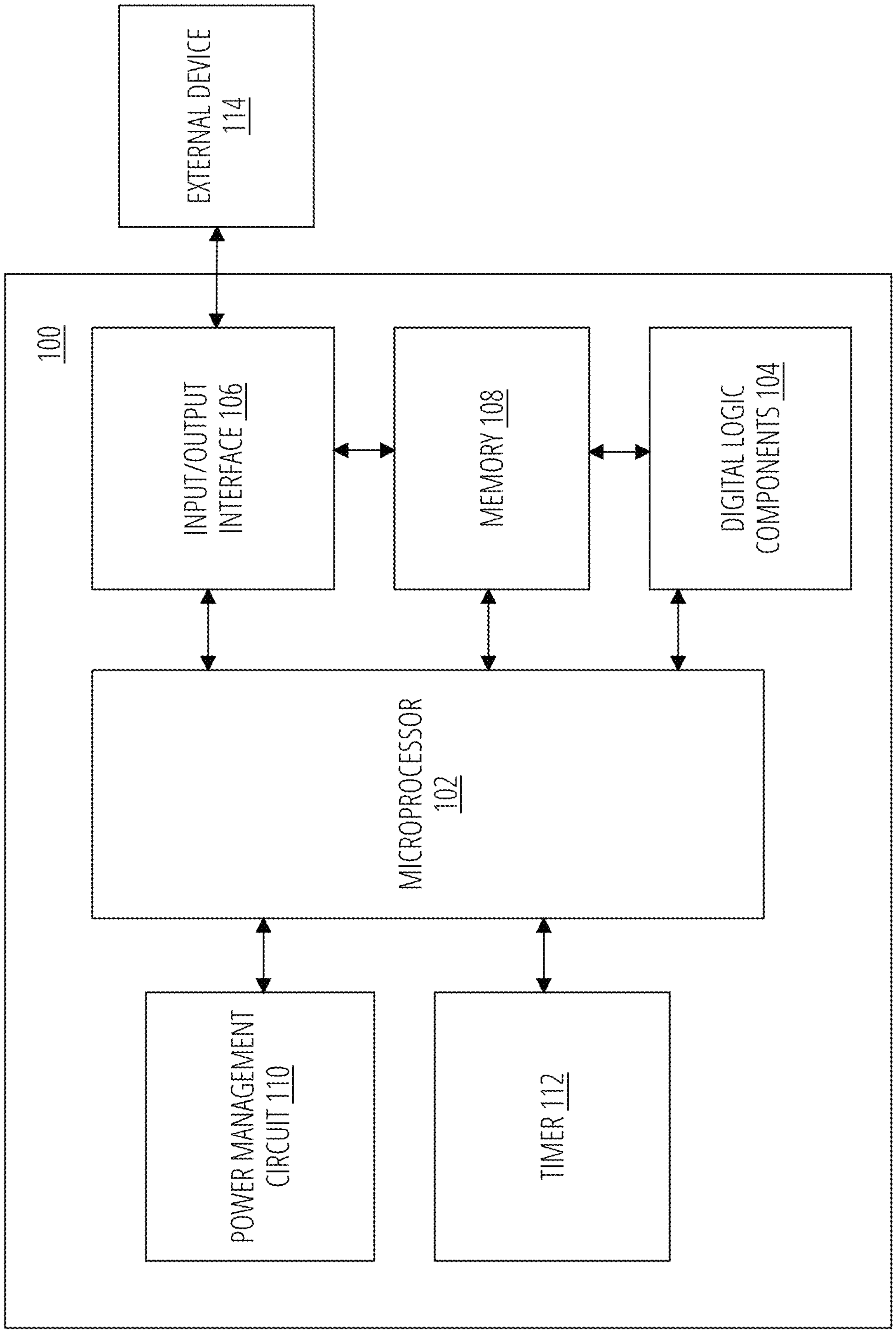
FIG. 1 is a block diagram illustrating an embedded system, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The present disclosure provides systems and methods for dynamically compressing image data to a preset size range in real-time image transmission. First, an image frame is obtained. The image frame may be captured by a camera sensor associated with the system. This image frame is then divided into a set of smaller image blocks, each comprising a predetermined count of pixels, such as 4×4 pixels, 4×8 pixels, 8×8 pixels, 16×16 pixels, etc. In some examples, the image block may initially be presented in RGB (red, green, blue) values. Human eyes are usually more sensitive to light intensity (luminous level) than colors. Optionally, the RGB values may be converted to YCbCr values, where Y denotes luma component levels, and CbCr denotes chroma component levels. The luma component levels can be retained and chroma component levels may be pre-compressed, for example, by averaging the values in 2*2 sub-block.

A preliminary quantization profile, also referred to as a preliminary quantization table, is then obtained. The preliminary quantization profile may be a standard or a customized quantization profile and contains quantization factors for each pixel within the blocks. The system may perform a frequency-conversion transformation, such as Discrete Cosine Transform (DCT), or the like, on each image block to convert the spatial image data thereof into a frequency-dependent image profile.

After transforming the image data into the frequency-dependent image profile, the profile is quantized using the preliminary quantization profile to reduce the high-frequency image components, which are less perceptible to human eyes. Following quantization, the system employs one or more encoding algorithms to further compress the quantized data. These algorithms may include lossless algorithms such as Zigzag encoding, Huffman encoding, or run-length encoding (RLE), as well as potentially lossy algorithms. The compressed image blocks are then combined to generate a compressed image frame.

Subsequently, the system compares the size of this compressed image frame with a predefined target size range. If the size of the compressed frame falls outside this range, the preliminary quantization profile may be updated. If the system supports dynamic encoding (e.g., dynamically scaling the quantization profile), the quantization factors in the preliminary quantization profile may be increased or decreased by a preset step size. The preset step size can be 10%, 20%, 30%, 50%, etc. If the system does not support dynamic encoding, the quantization profile can be updated by selecting a new quantization profile from a pool of predetermined quantization profiles. The predetermined quantization profiles may correspond to different compression levels. If the system supports adaptive step size adjustment, the system may adjust the step size based on a comparison between the size of the compressed image and the target size range. For example, if the size of the compressed image is larger than two times of an upper limit of the target size range, the system may adjust the step size to be two times or four times of its original value for a faster convergence. It should be noted that the relationship between the size of the compressed image and the quantization factor is usually non-linear, so when the size of compressed image is two times greater than the upper limit, it does not necessarily mean that the quantization factor shall be doubled. This is why method in the present disclosure adjusts the quantization factor based on a fixed or adaptively changed step size to gradually approach the target size range.

It should be noted that the present method can be used to iteratively update the same image frame until it falls within the target size range and/or to update the quantization profile in real-time so (although the first image frame may fall outside the target size range) the subsequent image frames can be within the target size range. For example, the succeeding image frame may be compressed using the newly updated quantization profile and the compressed succeeding image frame may have a size within or more approaching to the target size range.

In addition, the system may dynamically modify the target size range, based on varying factors such as environmental conditions (light intensity, colors, etc.) and/or network conditions (e.g., bandwidth change, network traffic) of the system.

The present disclosure potentially has at least the following advantages:

1. Efficiency in bandwidth and storage usage: the system dynamically compresses image data to fit within a predefined size range, which can significantly reduce the amount of bandwidth required for transmitting images and the storage space needed for saving them.
2. Adaptability to changing conditions: the system can adjust target size range dynamically to respond effectively to varying environmental (e.g., light conditions) and network conditions (e.g., bandwidth).
3. Real-time processing capability: the system updates the quantization profile in real-time to allow for immediate adaptation to changes in image content and transmission requirements.

Based on the above advantages, the present disclosure, unlike other image compression methods (such as JPEG), is compatible with embedded systems which have limited processing power, memory, and storage. Of course, the present method can also be used in other systems, devices, and platforms, with a highly competitive performance.

FIG. 1 is a block diagram illustrating an embedded system 100, in accordance with some example embodiments. As shown in FIG. 1, the embedded system 100 may include a microprocessor 102, digital logic components 104, an input/output interface 106, a memory 108, a power management circuit 110, and a timer 112. The embedded system 100 may be connected to an external device 114 such as a camera, which captures real-time image data.

The microprocessor 102 is a electronic component that functions as the central unit of data processing. The microprocessor 102 processes the instructions from the embedded system 100's firmware or software, interacts with other hardware components, and controls the operations of the embedded system 100.

The digital logic components 104 are circuitry elements designed to interpret and produce binary signals. The digital logic components 104 handle specific tasks such as the Discrete Cosine Transform (DCT), encoding/decoding, and other operations of the dynamic compression process. The digital logic components 104 serve as the backbone of data processing operations, interpreting inputs, executing logic, and generating outputs. In some examples, the digital logic components 104 are embedded in the microprocessor 102.

The input/output interface 106 serves as the link between internal devices (e.g., microprocessor 102, memory 108) and external devices (e.g., external device 114). It facilitates the transfer of image data between the embedded system 100 and external devices and is configured to handle high data throughput, enabling the system to receive raw image data from the camera and output compressed image data efficiently.

The memory 108 stores raw image data, pre-compressed image files, compressed and/or encoded image files, compression/decompression algorithms, encoding/decoding algorithms, and dynamic quantization profiles, etc. The memory 108 may include both volatile and non-volatile components, providing fast access to data needed for real-time processing and preserving essential information when the system is powered down.

The power management circuit 110 optimizes energy consumption, particularly important in portable or remote applications of the embedded system 100. The power management circuit 110 may adjust power usage based on the operational demands of the system, which can vary significantly during intensive image processing tasks.

The timer 112 ensures that specific operations occur at precise intervals, allowing for efficient pipelining of tasks. Furthermore, the timer 112 can trigger events or generate interrupts based on predefined intervals, ensuring that the image compression process is both timely and synchronized with other system operations.

The external device 114, typically a camera or image sensor, is integral to the system 100's operation, providing the raw image data required for compression. The external device 114 may also include other peripherals like storage devices or displays, depending on the application scenarios.

It should be noted that the embedded system 100 is for illustrative purpose and shall not be limiting. Components in the embedded system 100 may be combined, altered, or omitted. Extra components can be included in the embedded system 100. It should also be noted that the present disclosure can be employed by other types of systems such as tablets, cell phones, computers, and servers. Such applications are also within the protection scope of the present disclosure.

Figure 2:
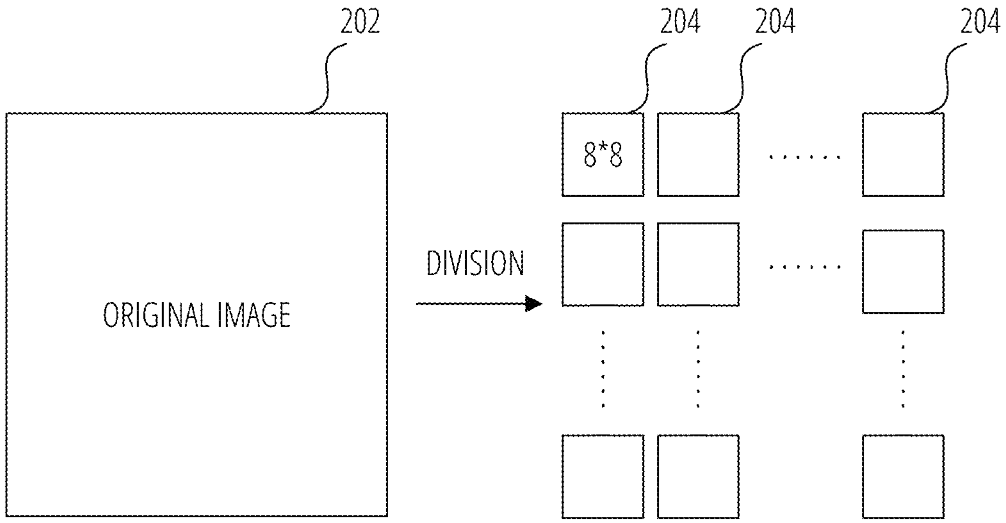
FIG. 2 is a schematic diagram illustrating an example step of dividing an original image into image blocks, in accordance with some example embodiments.

FIG. 2 is a schematic diagram illustrating an example step of dividing an original image 202 into image blocks 204, in accordance with some example embodiments. The division of the image 202 into the smaller blocks 204 simplifies the processing of the original image 202 because each divided image block 204 can then be handled separately, which can enhance the efficiency of the subsequent processing steps. For example, different blocks 204 can be assigned to different processing units within the embedded system 100. This parallel processing approach allows multiple blocks 204 to be compressed simultaneously, speeding up the overall compression process.

In some examples, the size of the image blocks 204 can vary depending on the specific requirements of the compression algorithm and the characteristics of the image being processed. Example sizes for image blocks 204 may include 4*4 pixels, 4*8 pixels, 8*8 pixels, 16*16 pixels, and 32*32 pixels, etc. The sizes may be chosen to balance the granularity of compression with computational efficiency. Smaller blocks may allow for more detailed compression at the cost of increased processing time, while larger blocks can be processed faster but might result in less detailed compression. The image blocks 204 may have same or different sizes.

In some alternative examples, an adaptive block sizing may be employed where the size of the image blocks 204 is dynamically adjusted based on the content of the original image 202. For instance, areas of the image 202 with high detail and variability might be divided into smaller blocks to preserve image quality after compression, whereas areas with less detail might be segmented into larger blocks to maximize compression efficiency.

In some additional examples, the division of the image 202 into blocks 204 can be guided by an analysis of the image content in the image 202. Techniques such as edge detection or region-based segmentation can be used to determine the boundaries of the blocks 204, ensuring that the division aligns with natural breaks in the image content in the image 202.

Figure 3A:
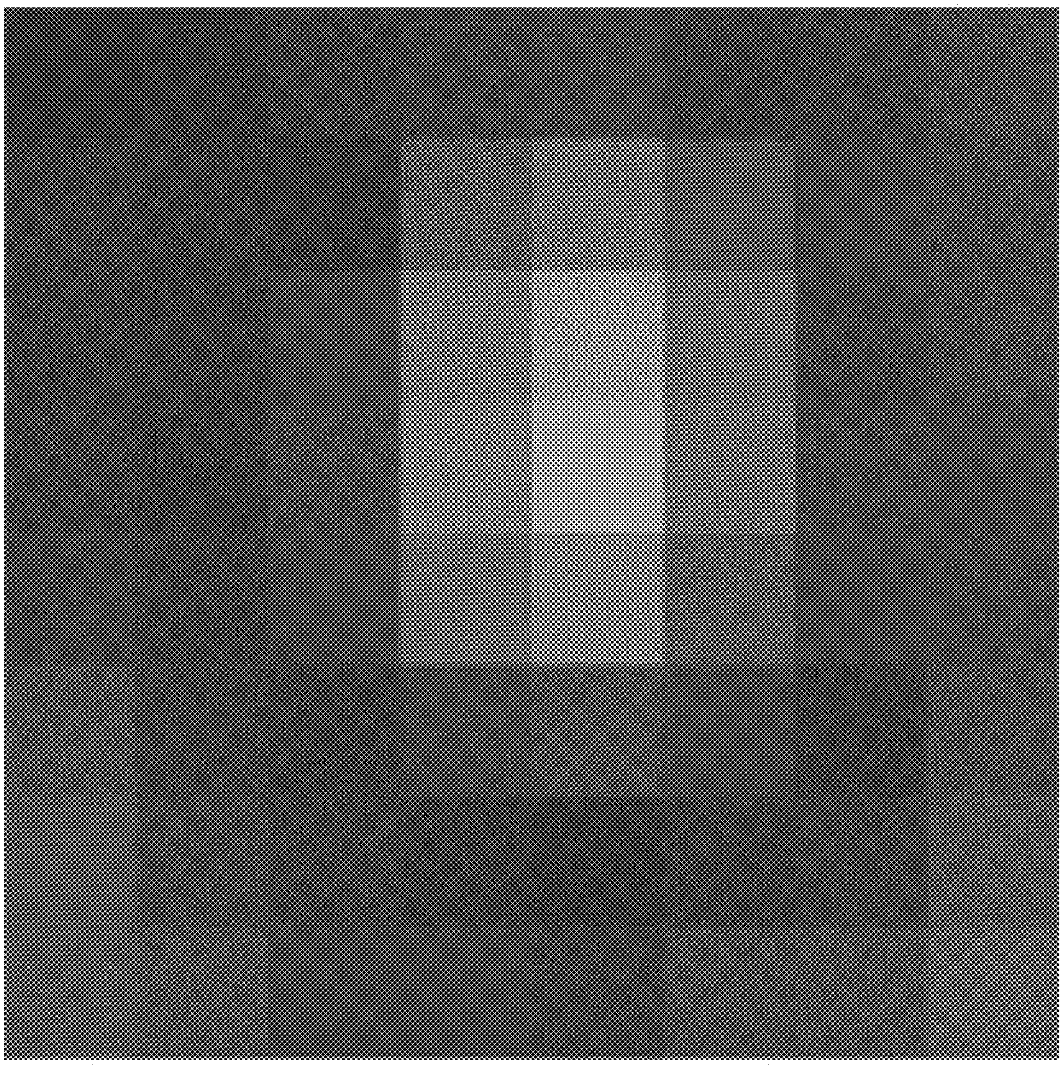
FIG. 3A illustrates an example image block, in accordance with some example embodiments.

FIG. 3A illustrates an example image block 302, in accordance with some example embodiments. The image block 302 includes 8*8 pixels and may correspond to one of the divided image blocks 204 as illustrated in FIG. 2. For the purpose of brevity in this illustration, image block 302 is exemplified as a grayscale image; however, this representation is not limiting. In practice, image blocks can contain color data, and the method discussed in the present disclosure can be applied to both grayscale and color images.

FIG. 3B illustrates RGB values 304 of pixels in the example image block, in accordance with some example embodiments. For example, each pixel within the image block is represented by RGB (Red, Green, Blue) values, which range from 0 to 255, with 0 representing no intensity and 255 representing maximum intensity. For instance, an RGB value of (255, 0, 0) represents bright red, an RGB value of (0, 255, 0) represents vivid green, an RGB value of (0, 0, 255) represents deep blue, an RGB value of (0, 0, 0) represents black, and an RGB value of (255,255,255) represents white. When the values of the red, green, and blue channels are identical as illustrated in FIG. 3B, the pixels are white, grey, or black. In some examples, pixels with higher RGB values in the greyscale image block 302 is lighter than pixels with lower RGB values.

FIG. 4A illustrates luma component levels 402 of pixels in the example image block 302, in accordance with some example embodiments. The luma component, denoted as 'Y' in a YCbCr color model, represents the brightness information of the image block 302. The luma component is essential for the perception of image detail as it reflects the lightness or darkness of colors, where lower values indicate darker areas and higher values indicate lighter areas. Because the human visual system is more sensitive to variations in brightness than to color, the luma component is more important than chroma components ("Cb" and "Cr").

Figure 4B:
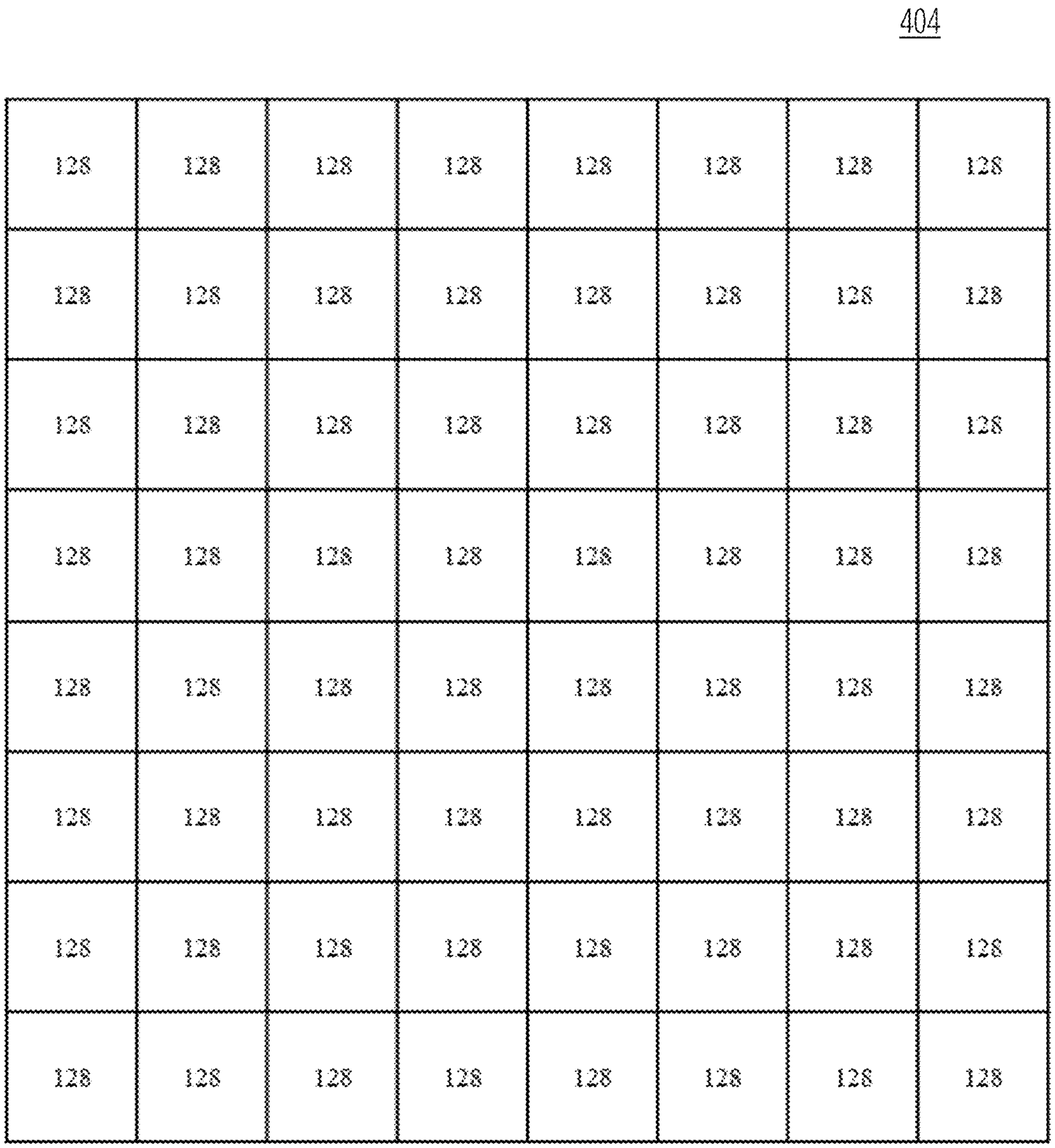
FIG. 4B illustrates chroma component levels of pixels in the example image block, in accordance with some example embodiments.

FIG. 4B illustrates chroma component levels 404 of pixels in the example image block 302, in accordance with some example embodiments. The chroma components, represented as 'Cb' for blue-difference and 'Cr' for red-difference, represent the deviations of the blue and red components from the brightness, respectively. In the context of grayscale images, these chroma components are typically at a central-level value of 128, indicating that there is no color deviation.

In some examples, an initial image frame is captured in RGB values, and a conversion is performed to convert the RGB values to YCbCr values. The conversion may be performed based on the following formula (1)

$$Y' = 16 + (65.481 \cdot R' + 128.553 \cdot G'' + 24.966 \cdot B') \quad (1)$$
$$C_B = 128 + (-37.797 \cdot R' - 74.203 \cdot G'' + 112.0 \cdot B')$$
$$C_R = 128 + (112.0 \cdot R' - 93.786 \cdot G'' - 18.214 \cdot B')$$

where R' denotes Red value, G" denotes Green value, B' denotes Blue value, Y' denotes Y value, $C_B$ denotes blue-difference chroma value, $C_R$ denotes red-difference chroma value. Alternatively, the initial image frame is captured in YCbCr color model. In some other examples, an initial image frame captured in RGB values are not converted. Alternatively, other color model may be used. Such variations are also protected by the scope of present disclosure.

In some examples, a pre-compression may be performed on the values in YCbCr color model. Since human is more sensitive to variations in brightness, the luma component values 402 may remain unchanged while the chroma component values 404 may be compressed. For example, the value of chroma component values of a sub-block (e.g., 2*2 pixels) may be averaged so the subsequent compression can be more efficient and effective.

FIG. 5 illustrates a centralized luma component levels 502 of pixels in the example image block, in accordance with some example embodiments. Centralizing the luma component levels 402 involves adjusting the original range of luma component values 402, e.g., from 0 to 255, to a new range of luma component values 502 that centers around zero, e.g., from −128 to 127. This adjustment is achieved by subtracting 128 from each original luma component value 402.

By shifting the range of luma component values 402 to center around zero, mathematical operations on these values, particularly those involving transformations and optimizations, can be performed more efficiently and with greater numerical stability.

In some examples, the centralization process enhances the performance of algorithms that rely on symmetry and balance around zero, such as a Discrete Cosine Transform (DCT). The DCT, which transforms spatial domain data into frequency domain data, benefits from data that is symmetrically distributed around zero, leading to better energy compaction and more effective compression.

FIG. 6 illustrates a frequency-dependent profile 602 of the centralized luma component levels 502 of pixels in the example image block 302, in accordance with some example embodiments. In some examples, the frequency-dependent profile 602 is generated based on a transform that converts spatial domain data to frequency domain data. The transform may include a DCT, but it's not limiting.

The DCT operates by decomposing the image block 302 into a sum of cosine functions oscillating at different frequencies. In the resulting frequency-dependent profile 602, the low-frequency components, which represent the general trends or slow changes in pixel values across the image block, are typically located towards the top-left corner of the DCT matrix. Conversely, the high-frequency components, which capture the finer details and rapid changes in pixel values, are positioned towards the bottom-right corner. Because human vision is more sensitive to variations in low-frequency components than high-frequency components, the DCT allows compression algorithms to apply more aggressive compression to the high-frequency components without significantly affecting the perceived image quality. By reducing the precision or even discarding some of the high-frequency components, substantial data reduction can be achieved, leading to more efficient storage and transmission of images.

FIG. 7 illustrates an example quantization profile 702 for luma component levels 502, in accordance with some example embodiments. The quantization profile 702 is used to reduce the number of bits required to store the centralized luma component levels 502, effectively compressing the image block 302 by reducing the precision of the frequency-dependent profile 602.

Quantization in image compression involves mapping a range of values to a single quantization value. The quantization profile 702 shown in FIG. 7 includes a matrix of quantization factors that are applied to the corresponding values of frequency-dependent profile 602. These quantization factors are designed to be larger for high-frequency components and smaller for low-frequency components, reflecting the varying sensitivity of human vision to different frequencies.

FIG. 8 illustrates a quantized image block 802, in accordance with some example embodiments. For example, each value in the frequency-dependent profile 602 is divided by a corresponding quantization factor in the quantization profile 702 and rounding to nearest integer to generate the quantized image block 802.

Figure 9:
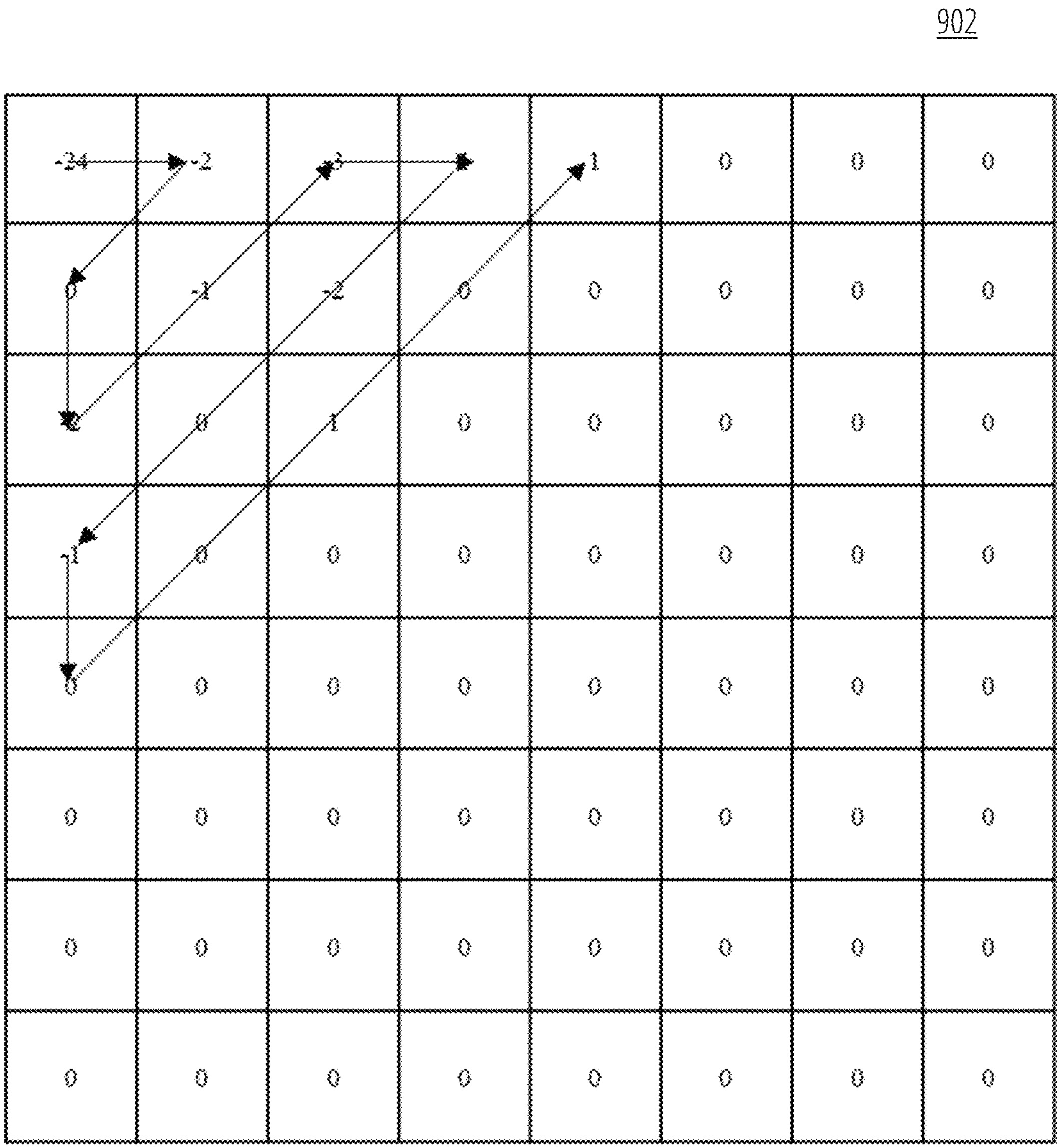
FIG. 9 is a schematic diagram illustrating a step of performing a zigzag encoding on the quantized image block, in accordance with some example embodiments.

FIG. 9 is a schematic diagram illustrating a step of performing a zigzag encoding on the quantized image block 802, in accordance with some example embodiments. Zigzag encoding is a method used to further compress the data by taking advantage of the structure of the quantized image block 802. The Zigzag encoding follows a zigzag pattern through the quantized image block 802, starting from the top-left corner and moving towards the bottom-right corner.

The purpose of zigzag encoding is to sequence the values in the quantized image block 802 in a way that groups zero values together. Since the higher frequency components (towards the bottom-right of the matrix) are more likely to be quantized to zero, following a zigzag pattern ensures that these zeros are grouped, making the data more amenable to subsequent compression steps such as run-length encoding, Huffman encoding, or entropy encoding.

In some examples, the values in the zigzagged image block 902 are represented as {−24, −2, 0, −2, −1, −3, 1, −2, 0, −1, 0, 0, 1, 0, 1, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0}. A run-length encoding algorithm may be applied to group the zeros as {−24, −2, 0, −2, −1, −3, 1, −2, 0, −1, 0, 0, 1, 0, 1, (0, 49)}, effectively reducing the size from 64 values to 17 values. Additional encoding and/or processing algorithm may also be performed, and such variations are within the protection scope of the present disclosure.

FIG. 10 illustrates an updated quantization profile 1002 for luma component levels, in accordance with some example embodiments. In some examples, a size of the image frame 202 after compression may be greater than an upper limit of a target size range. The quantization profile 702 may be updated based on a preset step size using the following formula (2)

$$Q' = Q(1 - T) \tag{2}$$

where Q' denotes updated quantization profile, Q denotes original quantization profile, and T denotes preset step size. The preset step size may be 10%, 20%, 30%, 50%, etc.

In the present example, the preset step size is 50% (0.5) and the quantization profile 702 is updated by multiplying each of the quantization factor thereof by (1-0.5).

FIG. 11 illustrates a quantized image block 1102 generated based on the updated quantization profile 1002, in accordance with some example embodiments. Similar to quantized image block 802, each value in the frequency-dependent profile 602 is divided by a corresponding quantization factor in the updated quantization profile 1002 and rounding to nearest integer to generate the quantized image block 1102. After preforming the zigzag encoding and the run-length encoding algorithms on the quantized image block 1102, the values may be represented as {−46, −3, 0, −4, −2, −5, 1, −5, 1, −2, 0, 0, 3, 0, 1, 0, 0, 0, 1, (0, 6), −1, (0, 37)}, increasing the size from 17 values to 24 values and thereby increasing the size of the compressed image frame.

FIG. 12 illustrates an updated quantization profile 1202 for luma component levels, in accordance with some example embodiments. In some examples, a size of the image frame 202 after compression may be smaller than a lower limit of a target size range. The quantization profile 702 may be updated based on a preset step size using the following formula (3)

$$Q' = Q(1 + T) \tag{3}$$

In the present example, the preset step size is 50% (0.5). But the system may determine that the size of the image 202 after compression is significantly smaller than the lower limit of the target size range. Accordingly, the preset step size may be adaptively adjusted to be 300%. The quantization profile 702 is updated by multiplying each of the quantization factor thereof by (1+3).

FIG. 13 illustrates a quantized image block 1302 generated based on the updated quantization profile 1202, in accordance with some example embodiments. Similar to the quantized image block 802, each value in the frequency-dependent profile 602 is divided by a corresponding quantization factor in the updated quantization profile 1202 and rounding to nearest integer to generate the quantized image block 1302. After preforming the zigzag encoding and the run-length encoding algorithms on the quantized image block 1302, the values may be represented as {−6, (0, 4), −1, 0, −1, (0, 56)}, reducing the size from 17 values to 8 values and thereby decreasing the size of the compressed image frame.

Figure 14:
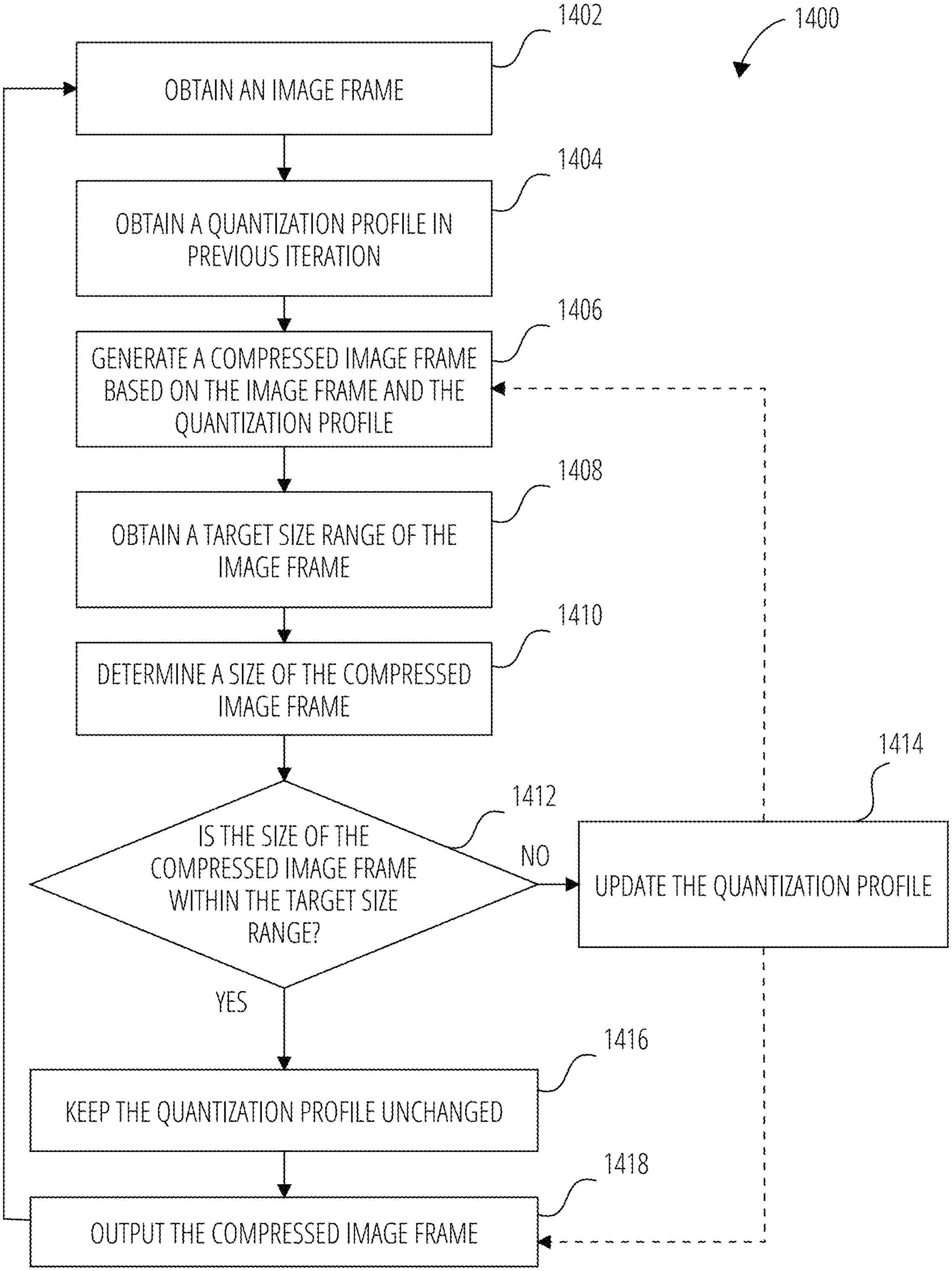
FIG. 14 is a flowchart illustrating operations of the embedded system in dynamically compressing an image frame to a target size range, in accordance with some example embodiments.

FIG. 14 is a flowchart illustrating operations of the embedded system 100 in dynamically compressing an image frame to a target size range, in accordance with some example embodiments. The method 1400 may be embodied in computer-readable instructions for execution by one or more processors such that operations of the method 1400 may be performed in part or in whole by the functional components of the embedded system 100; accordingly, the method 1400 is described below by way of example with reference thereto. However, it shall be appreciated that at least some of the operations of the method 1400 may be deployed on various other hardware configurations than the embedded system 100. Also, the operations of the method 1400 may be partially omitted, or performed in any order.

In operation 1402, the embedded system 100 may obtain an image frame. The image frame may be captured directly from a camera within the embedded system 100 or received from an external source. The image frame may initially be in a high-resolution format that requires compression to meet storage or transmission requirements for the embedded system 100. In some examples, the image frame is a frame of multiple continuous frames in a real-time video communication, such as image frames captured at a home surveillance system.

In operation 1404, the embedded system 100 may obtain a quantization profile from a previous iteration. If it is the first iteration, a preliminary quantization profile may be obtained. The quantization profile may include quantization factors that dictate how much each component of the image frame should be compressed, focusing particularly on reducing the precision of less perceptible high-frequency components to achieve effective data size reduction.

In operation 1406, the embedded system 100 may generate a compressed image frame based on the image frame and the quantization profile. In some examples, operation 1406 may include sub-operations, such as:

RGB to YCbCr Conversion: Optionally, if the image frame is initially in RGB format, it may be converted to the YCbCr color space, where Y represents the luma component (brightness) and Cb and Cr represent the chroma components (color differences). This conversion is beneficial for compression as it aligns more closely with human visual perception, emphasizing brightness over color.

Discrete Cosine Transform (DCT): Each block of the image may be transformed from the spatial domain to the frequency domain. The DCT helps to separate the image into parts of differing importance concerning the human visual perception.

Quantization: The frequency domain data of each block may then be quantized using the obtained quantization profile. This sub-step reduces the number of bits required to represent the less critical information, which typically includes high-frequency components.

Encoding: The quantized data may be encoded using data compression algorithms such as Zigzag encoding, Huffman coding, or Run-Length Encoding (RLE). These methods help to further reduce the data size by eliminating redundancies and efficiently encoding the data.

In operation 1408, the embedded system 100 may obtain a target size range for the image frame. The target size range may be predefined based on the application's requirements and can vary significantly, from a few bytes to several megabytes. This target size range guides the compression process to ensure that the output meets specific storage or transmission requirements without compromising too much on image quality. The target size range may be adjusted based on network conditions and environmental conditions of the embedded system 100. For example, the target size range can be reduced at lower bandwidth and increased at higher bandwidth. As another example, the target size range can be reduced during the night and increased during the day.

In operation 1410, the embedded system 100 may determine the size of the compressed image frame. The size of the compressed image frame may be referred to here as the code size for storing the compressed image frame. Operation 1410 may include calculating the total amount of data (in bytes or bits) that the compressed image frame occupies.

In operation 1412, the embedded system 100 may determine whether the size of the compressed image frame is within the target size range. In response to a determination that the size of the compressed image frame is within the target size range, the method 1400 proceeds to operation 1416; otherwise, the method 1400 proceeds to operation 1414.

In operation 1416, the embedded system 100 may keep the quantization profile unchanged, indicating that the current settings effectively achieve the desired compression.

In operation 1418, the embedded system 100 may output the compressed image frame. This output may involve storing the frame for later use or transmitting it immediately via wireless or wired communication methods, depending on the application's needs. After operation 1418, the method 1400 may proceed back to operation 1402 to process a new image frame, continuing the cycle of capturing, compressing, and transmitting image data.

In operation 1414, the embedded system 100 may update the quantization profile based on the difference of the compressed image size from the target range. This may involve adjusting the quantization factors to either increase or decrease the level of compression or replacing the quantization profile in the current iteration with a new one selected from a plurality of predetermined quantization profiles. Details regarding the updating of the quantization profile in operation 1414 may be found in FIG. 15 and the descriptions thereof.

Optionally, the method 1400 may loop back to operation 1406 to reprocess the same image frame with the updated quantization profile until it falls within the target size range. Alternatively, or additionally, the method 1400 may move directly to operation 1418 to output the compressed image frame and then return to operation 1402 to obtain a new frame. This approach ensures that even if the first image frame does not meet the target size criteria, subsequent frames are more likely to comply, thereby optimizing the system's performance over time. Another benefit is that no frames would be delayed in real-time transmission.

Figure 15:
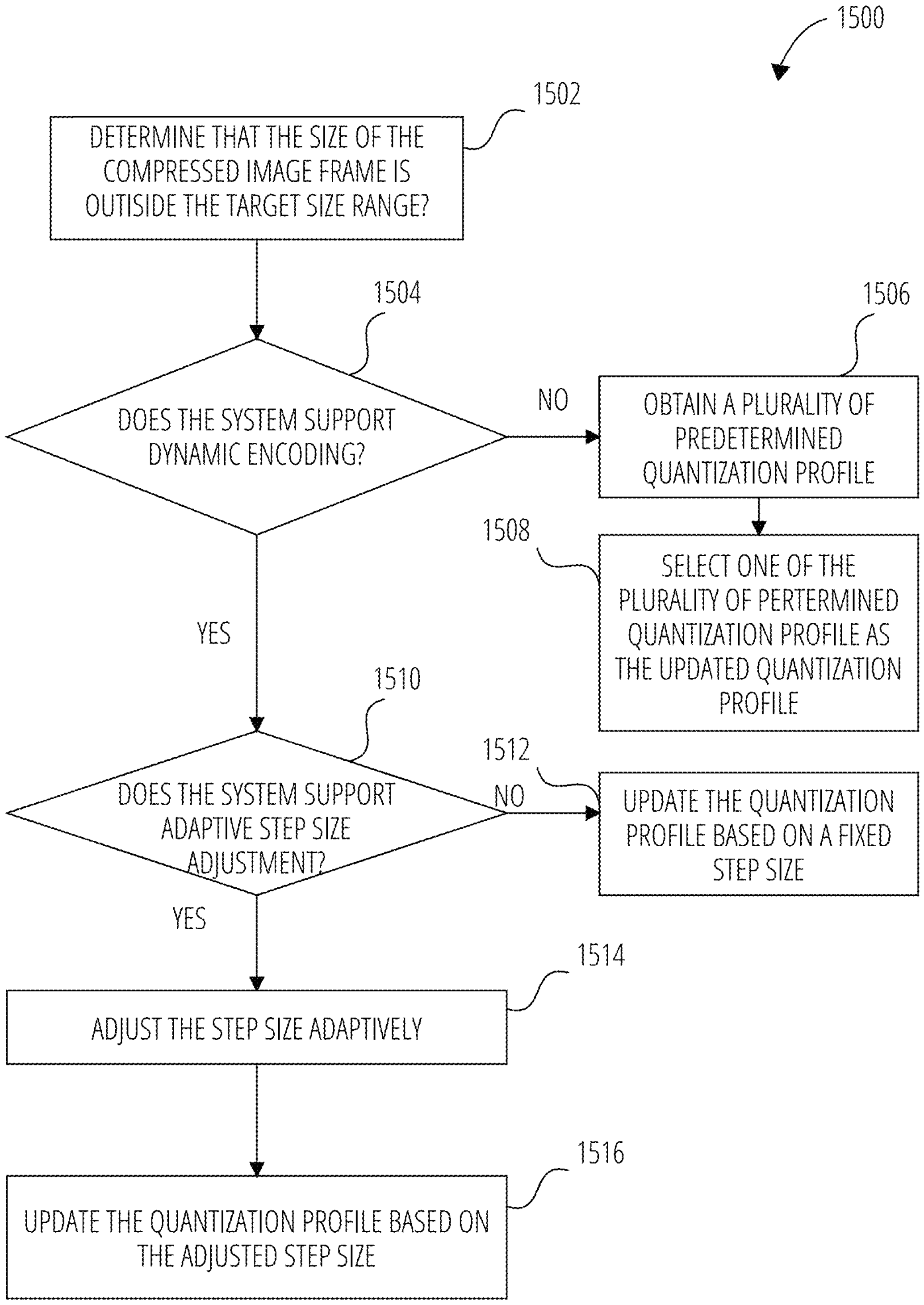
FIG. 15 is a flowchart illustrating operations of the embedded system in updating a quantization profile, in accordance with some example embodiments.

FIG. 15 is a flowchart illustrating operations of the embedded system 100 in updating a quantization profile, in accordance with some example embodiments. The method 1500 may be embodied in computer-readable instructions for execution by one or more processors such that operations of the method 1500 may be performed in part or in whole by the functional components of the embedded system 100; accordingly, the method 1500 is described below by way of example with reference thereto. However, it shall be appreciated that at least some of the operations of the method 1500 may be deployed on various other hardware configurations than the embedded system 100. Also, the operations of the method 1500 may be partially omitted, or performed in any order. In some examples, the method 1500 may correspond to operation 1414 in FIG. 14.

In operation 1502, the embedded system 100 may determine that the size of the compressed image frame is outside the target size range. The determination may be made in response to operation 1412 in FIG. 14.

In operation 1504, the embedded system 100 may determine whether it supports dynamic encoding, such as dynamically scaling the quantization profile. The determination may include checking a configuration bit on certain stored address of the embedded system 100's memory. If the bit is set to 1, dynamic encoding is enabled or supported; if the bit is set to 0, dynamic encoding is disabled or unsupported. If the embedded system 100 does not support dynamic encoding, the method 1500 proceeds to operation 1506; otherwise, the method 1500 proceeds to operation 1510.

In operation 1506, the embedded system 100 may obtain a plurality of predetermined quantization profiles. The predetermined quantization profiles may correspond to different compression levels. The predetermined quantization profiles may be ordered based on the different compression levels.

In operation 1508, the embedded system 100 may select one of the plurality of predetermined quantization profiles as the updated quantization profile. For example, in scenarios where the size of compressed image frame is greater than an upper limit of the target size range, a quantization profile with higher compression level may be selected to replace the current quantization profile. Similarly, in scenarios where the size of compressed image frame is less than a lower limit of the target size range, a quantization profile with lower compression level may be selected to replace the current quantization profile.

In operation 1510, the embedded system 100 may determine whether the system supports adaptive step size adjustment. If not, the method 1500 proceeds to operation 1512; otherwise, the method 1500 proceeds to operation 1514.

In operation 1512, the embedded system 100 may update the quantization profile based on a preset fixed step size. In some examples, operation 1512 may include: increasing quantization factors in the quantization profile based on a preset step size if the size of the compressed image frame is greater than an upper limit of the target size range and decreasing quantization factors in the quantization profile based on the preset step size if the size of the compressed image frame is less than a lower limit of the target size range.

In operation 1514, the embedded system 100 may adjust the step size adaptively. In some examples, operation 1514 may include reducing the step size if increasing the quantization factor would cause the size of an updated compressed image frame to exceed the upper limit but decreasing the quantization factor would cause the size to fall below the lower limit (the size of the compressed image bouncing up and down but never falls within the target size range). The step size may be reduced by 10%, 20%, 30%, 50%, etc.

The operation 1514 may also include increasing the step size if the size of the compressed image frame is more than a preset multiplier of the upper limit or less than a preset fraction of the lower limit. The preset multiplier may include 1.5, 2, 3, 5, 10, etc. The preset fraction may include 10%, 20%, 40%, 50%, 70%, etc. The step size may be increased to two time, four times, etc. of its original value.

Similar to operation 1512, the embedded system 100 may in operation 1516 update the quantization profile based on the adjusted step size.

In some examples, the embedded system 100 may offer user interactivity and customization, allowing users to adjust settings through various interfaces. For example, users can control and modify settings via a mobile app, set preferences at the initial setup, or use a dedicated control panel. This adaptability ensures that users can tailor the image compression process to their specific needs, whether they are adjusting quantization profiles or selecting different compression algorithms.

To be clear, the term "size" of the compressed image frame is not directly related to the resolution of the compressed image frame but rather is directly related to a coding rate or a compression rate. Since different components of the compressed image frame are encoded using different amount of code data, the size of the compressed image frame can vary even at same resolution.

Examples

1. A method at a system (e.g., an embedded system) for image compression, the method comprising:
   - obtaining a first image frame (e.g., by reading from a memory);
   - dividing the first image frame into a set of image blocks, each of the set of image blocks comprising a predetermined count of pixels;
   - obtaining a preliminary quantization profile (e.g., by reading from the memory), the preliminary quantization profile comprising a preliminary quantization factor corresponding to each of the predetermined count of pixels;
   - generating a first compressed image frame based on the set of image blocks of the first image frame and the preliminary quantization profile;
   - obtaining a target size range of the first image frame;
   - comparing a size of the first compressed image frame with the target size range of the first image frame;
   - updating the preliminary quantization profile based on the comparison between the size of compressed image frame with the target size range of the first image frame and storing the updated preliminary quantization profile in the memory;
   - obtaining a second image frame; and
   - generating a second compressed image frame based on the second image frame and the updated preliminary quantization profile.

2. The method of example 1, wherein the generating of the first compressed image frame based on set of image blocks of the first image frame and the preliminary quantization profile comprises:
   - performing a Discrete Cosine Transform (DCT) on each of the set of image blocks to generate a frequency-dependent image profile;
   - dividing each value in the frequency-dependent image profile by a corresponding preliminary quantization factor to generate a quantized frequency profile; and
   - compressing the quantized frequency profile based on at least one compression encoding algorithm to generate the compressed image frame.

3. The method of example 2, wherein the at least one compression encoding algorithm includes at least one of a Zigzag encoding algorithm, a Huffman encoding algorithm, or a run-length encoding (RLE) algorithm.

4. The method of any of examples 1-3, wherein the updating of the preliminary quantization profile based on the comparison between the size of the compressed image frame with the target size range of the first image frame comprises:
   - in response to a comparison result that the size of the compressed image frame is greater than an upper limit of the target size range, increasing the each preliminary quantization factor based on a preset step size; or
   - in response to a comparison result that the size of the compressed image frame is less than a lower limit of the target size range, decreasing the each preliminary quantization factor based on the preset step size.

5. The method of example 4, further comprising:
   - in response to the comparison result that the size of the compressed image frame is less than the lower limit of the target size range but increasing the each preliminary quantization factor would cause the size of an updated compressed image frame to be greater than the upper limit, reducing the step size; or
   - in response to the comparison result that the size of the compressed image frame is greater than the upper limit of the target size range but decreasing the each preliminary quantization factor would cause the size of the updated compressed image frame to be less than the lower limit, reducing the step size.

6. The method of any of examples 4-5, further comprising:
   - determining that the size of the compressed image frame exceeds a preset multiplier of the upper limit or falls below a preset fraction of the lower limit;
   - and increasing the step size.

7. The method of any of examples 1-3, wherein the updating of the preliminary quantization profile based on the comparison between the size of the compressed image frame with the target size range comprises:
   - in response to determining that the size of the compressed image frame is within the target size range, keeping the preliminary quantization profile unchanged.

8. The method of any of examples 1-3, wherein the updating of the preliminary quantization profile based on the comparison between the size of the compressed image frame with the target size range comprises:
   - selecting a quantization profile from a plurality of predetermined quantization profiles.

9. The method of any of examples 1-8, further comprising:

dynamically adjusting the target size range of the first image frame based on environmental conditions of the system.

10. The method of any of examples 1-9, further comprising:

dynamically adjusting the target size range of the first image frame based on network condition of the system.

11. A system (e.g., an embedded system) comprising:

a processor; and a non-transitory memory storing instructions that, when executed by the processor, configure the system to:

obtain a first image frame;

divide the first image frame into a set of image blocks, each of the set of image blocks comprising a predetermined count of pixels;

obtain a preliminary quantization profile, the preliminary quantization profile comprising a preliminary quantization factor corresponding to each of the predetermined count of pixels;

generate a first compressed image frame based on the set of image blocks of the first image frame and the preliminary quantization profile;

obtain a target size range of the first image frame;

compare a size of the first compressed image frame with the target size range of the first image frame;

update the preliminary quantization profile based on the comparison between the size of compressed image frame with the target size range of the first image frame;

obtain a second image frame; and generate a second compressed image frame based on the second image frame and the updated preliminary quantization profile.

12. The system of example 11, wherein to generate the first compressed image frame, the instructions configure the system to:

perform a Discrete Cosine Transform (DCT) on each of the set of image blocks to generate a frequency-dependent image profile;

divide each value in the frequency-dependent image profile by a corresponding preliminary quantization factor to generate a quantized frequency profile; and compress the quantized frequency profile based on at least one compression encoding algorithm to generate the compressed image frame.

13. The system of any of examples 11-12, wherein to update the preliminary quantization profile, the instructions configure the system to:

in response to a comparison result that the size of the compressed image frame is greater than an upper limit of the target size range, increase the each preliminary quantization factor based on a preset step size; or in response to a comparison result that the size of the compressed image frame is less than a lower limit of the target size range, decrease the each preliminary quantization factor based on the preset step size.

14. The system of example 13, wherein the instructions further configure the system to:

in response to the comparison result that the size of the compressed image frame is less than the lower limit of the target size range but increasing the each preliminary quantization factor would cause the size of an updated compressed image frame to be greater than the upper limit, reduce the step size; or in response to the comparison result that the size of the compressed image frame is greater than the upper limit of the target size range but decreasing the each preliminary quantization factor would cause the size of the updated compressed image frame to be less than the lower limit, reduce the step size.

15. The system of any of examples 13-14, wherein the instructions further configure the system to:

determine that the size of the compressed image frame exceeds a preset multiplier of the upper limit or falls below a preset fraction of the lower limit; and increase the step size.

16. The system of any of examples 11-12, wherein to update the preliminary quantization profile, the instructions configure the system to:

in response to determining that the size of the compressed image frame is within the target size range, keep the preliminary quantization profile unchanged.

17. The system of any of examples 11-12, wherein to update the preliminary quantization profile, the instructions configure the system to:

select a quantization profile from a plurality of predetermined quantization profiles.

18. The system of any of examples 11-17, wherein the instructions further configure the system to:

dynamically adjust the target size range of the first image frame based on environmental conditions of the system.

19. The system of any of examples 11-18, wherein the instructions further configure the system to:

dynamically adjust the target size range of the first image frame based on network condition of the system.

20. A non-transitory computer-readable storage medium, the computer-readable storage medium including instructions that when executed by a system, cause the system to:

obtain a first image frame;

divide the first image frame into a set of image blocks, each of the set of image blocks comprising a predetermined count of pixels;

obtain a preliminary quantization profile, the preliminary quantization profile comprising a preliminary quantization factor corresponding to each of the predetermined count of pixels;

generate a first compressed image frame based on the set of image blocks of the first image frame and the preliminary quantization profile;

obtain a target size range of the first image frame;

compare a size of the first compressed image frame with the target size range of the first image frame;

update the preliminary quantization profile based on the comparison between the size of compressed image frame with the target size range of the first image frame;

obtain a second image frame; and generate a second compressed image frame based on the second image frame and the updated preliminary quantization profile.

CONCLUSION

The present disclosure provides a system and a method for dynamically compressing image data to fit within a preset size range. After obtaining an image frame and dividing the image frame into a set of smaller image blocks, the system compresses the image frame based on a quantization profile. After compression, the size of the compressed image frame is compared with the preset size range and the quantization profile is updated based on the comparison result. When a new image frame is obtained, the updated quantization profile is used to compress the new image frame to make the size of compressed new image frame fall within or approach the boundary limits of the preset size range.

The present disclosure potentially has at least the following advantages: 1. Efficiency in bandwidth and storage usage: the system dynamically compresses image data to fit within a predefined size range, which can significantly reduce the amount of bandwidth required for transmitting images and the storage space needed for saving them. 2. Adaptability to changing conditions: the system can adjust target size range dynamically to respond effectively to varying environmental and network conditions. 3. Real-time processing capability: the system updates the quantization profile in real-time to allow for immediate adaptation to changes in image content and transmission requirements. Based on the above advantages, the present disclosure, unlike other image compression methods (such as JPEG), is compatible with embedded systems which have limited processing power, memory, and storage. The present method can also be used in other systems, devices, and platforms, with a highly competitive performance.

What is claimed is:

1. A method at a system for image compression, the method comprising:

obtaining a first image frame;

dividing the first image frame into a set of image blocks, each of the set of image blocks comprising a predetermined count of pixels;

obtaining a preliminary quantization profile, the preliminary quantization profile comprising a preliminary quantization factor corresponding to each of the predetermined count of pixels;

generating a first compressed image frame based on the set of image blocks of the first image frame and the preliminary quantization profile;

obtaining a target size range of the first image frame;

comparing a size of the first compressed image frame with the target size range of the first image frame;

updating the preliminary quantization profile based on the comparison between the size of compressed image frame with the target size range of the first image frame;

obtaining a second image frame; and generating a second compressed image frame based on the second image frame and the updated preliminary quantization profile.

2. The method of claim 1, wherein the generating of the first compressed image frame based on set of image blocks of the first image frame and the preliminary quantization profile comprises:

performing a Discrete Cosine Transform (DCT) on each of the set of image blocks to generate a frequency-dependent image profile;

dividing each value in the frequency-dependent image profile by a corresponding preliminary quantization factor to generate a quantized frequency profile; and compressing the quantized frequency profile based on at least one compression encoding algorithm to generate the compressed image frame.

3. The method of claim 2, wherein the at least one compression encoding algorithm includes at least one of a Zigzag encoding algorithm, a Huffman encoding algorithm, or a run-length encoding (RLE) algorithm.

4. The method of claim 1, wherein the updating of the preliminary quantization profile based on the comparison between the size of the compressed image frame with the target size range of the first image frame comprises:

in response to a comparison result that the size of the compressed image frame is greater than an upper limit of the target size range, increasing the each preliminary quantization factor based on a preset step size; or in response to a comparison result that the size of the compressed image frame is less than a lower limit of the target size range, decreasing the each preliminary quantization factor based on the preset step size.

5. The method of claim 4, further comprising:

in response to the comparison result that the size of the compressed image frame is less than the lower limit of the target size range but increasing the each preliminary quantization factor would cause the size of an updated compressed image frame to be greater than the upper limit, reducing the step size; or in response to the comparison result that the size of the compressed image frame is greater than the upper limit of the target size range but decreasing the each preliminary quantization factor would cause the size of the updated compressed image frame to be less than the lower limit, reducing the step size.

6. The method of claim 4, further comprising:

determining that the size of the compressed image frame exceeds a preset multiplier of the upper limit or falls below a preset fraction of the lower limit; and increasing the step size.

7. The method of claim 1, wherein the updating of the preliminary quantization profile based on the comparison between the size of the compressed image frame with the target size range comprises:

in response to determining that the size of the compressed image frame is within the target size range, keeping the preliminary quantization profile unchanged.

8. The method of claim 1, wherein the updating of the preliminary quantization profile based on the comparison between the size of the compressed image frame with the target size range comprises:

selecting a quantization profile from a plurality of predetermined quantization profiles.

9. The method of claim 1, further comprising:

dynamically adjusting the target size range of the first image frame based on environmental conditions of the system.

10. The method of claim 1, further comprising:

dynamically adjusting the target size range of the first image frame based on network condition of the system.

11. A system comprising:

a processor; and a non-transitory memory storing instructions that, when executed by the processor, configure the system to:

obtain a first image frame;

divide the first image frame into a set of image blocks, each of the set of image blocks comprising a predetermined count of pixels;

obtain a preliminary quantization profile, the preliminary quantization profile comprising a preliminary quantization factor corresponding to each of the predetermined count of pixels;

generate a first compressed image frame based on the set of image blocks of the first image frame and the preliminary quantization profile;

obtain a target size range of the first image frame;

compare a size of the first compressed image frame with the target size range of the first image frame;

update the preliminary quantization profile based on the comparison between the size of compressed image frame with the target size range of the first image frame;

obtain a second image frame; and generate a second compressed image frame based on the second image frame and the updated preliminary quantization profile.

12. The system of claim 11, wherein to generate the first compressed image frame, the instructions configure the system to:

perform a Discrete Cosine Transform (DCT) on each of the set of image blocks to generate a frequency-dependent image profile;

divide each value in the frequency-dependent image profile by a corresponding preliminary quantization factor to generate a quantized frequency profile; and compress the quantized frequency profile based on at least one compression encoding algorithm to generate the compressed image frame.

13. The system of claim 11, wherein to update the preliminary quantization profile, the instructions configure the system to:

in response to a comparison result that the size of the compressed image frame is greater than an upper limit of the target size range, increase the each preliminary quantization factor based on a preset step size; or in response to a comparison result that the size of the compressed image frame is less than a lower limit of the target size range, decrease the each preliminary quantization factor based on the preset step size.

14. The system of claim 13, wherein the instructions further configure the system to:

in response to the comparison result that the size of the compressed image frame is less than the lower limit of the target size range but increasing the each preliminary quantization factor would cause the size of an updated compressed image frame to be greater than the upper limit, reduce the step size; or in response to the comparison result that the size of the compressed image frame is greater than the upper limit of the target size range but decreasing the each preliminary quantization factor would cause the size of the updated compressed image frame to be less than the lower limit, reduce the step size.

15. The system of claim 13, wherein the instructions further configure the system to:

determine that the size of the compressed image frame exceeds a preset multiplier of the upper limit or falls below a preset fraction of the lower limit; and increase the step size.

16. The system of claim 11, wherein to update the preliminary quantization profile, the instructions configure the system to:

in response to determining that the size of the compressed image frame is within the target size range, keep the preliminary quantization profile unchanged.

17. The system of claim 11, wherein to update the preliminary quantization profile, the instructions configure the system to:

select a quantization profile from a plurality of predetermined quantization profiles.

18. The system of claim 11, wherein the instructions further configure the system to:

dynamically adjust the target size range of the first image frame based on environmental conditions of the system.

19. The system of claim 13, wherein the instructions further configure the system to:

dynamically adjust the target size range of the first image frame based on network condition of the system.

20. A non-transitory computer-readable storage medium, the computer-readable storage medium including instructions that when executed by a system, cause the system to:

obtain a first image frame;

divide the first image frame into a set of image blocks, each of the set of image blocks comprising a predetermined count of pixels;

obtain a preliminary quantization profile, the preliminary quantization profile comprising a preliminary quantization factor corresponding to each of the predetermined count of pixels;

generate a first compressed image frame based on the set of image blocks of the first image frame and the preliminary quantization profile;

obtain a target size range of the first image frame;

compare a size of the first compressed image frame with the target size range of the first image frame;

update the preliminary quantization profile based on the comparison between the size of compressed image frame with the target size range of the first image frame;

obtain a second image frame; and generate a second compressed image frame based on the second image frame and the updated preliminary quantization profile.

* * * * *